INVENTOR
Lucien C. Sturbelle
BY
ATTORNEY

Sept. 20, 1932.     L. C. STURBELLE     1,878,727
CENTRIFUGAL VARIABLE SPEED GEAR
Filed April 15, 1929     6 Sheets-Sheet 2
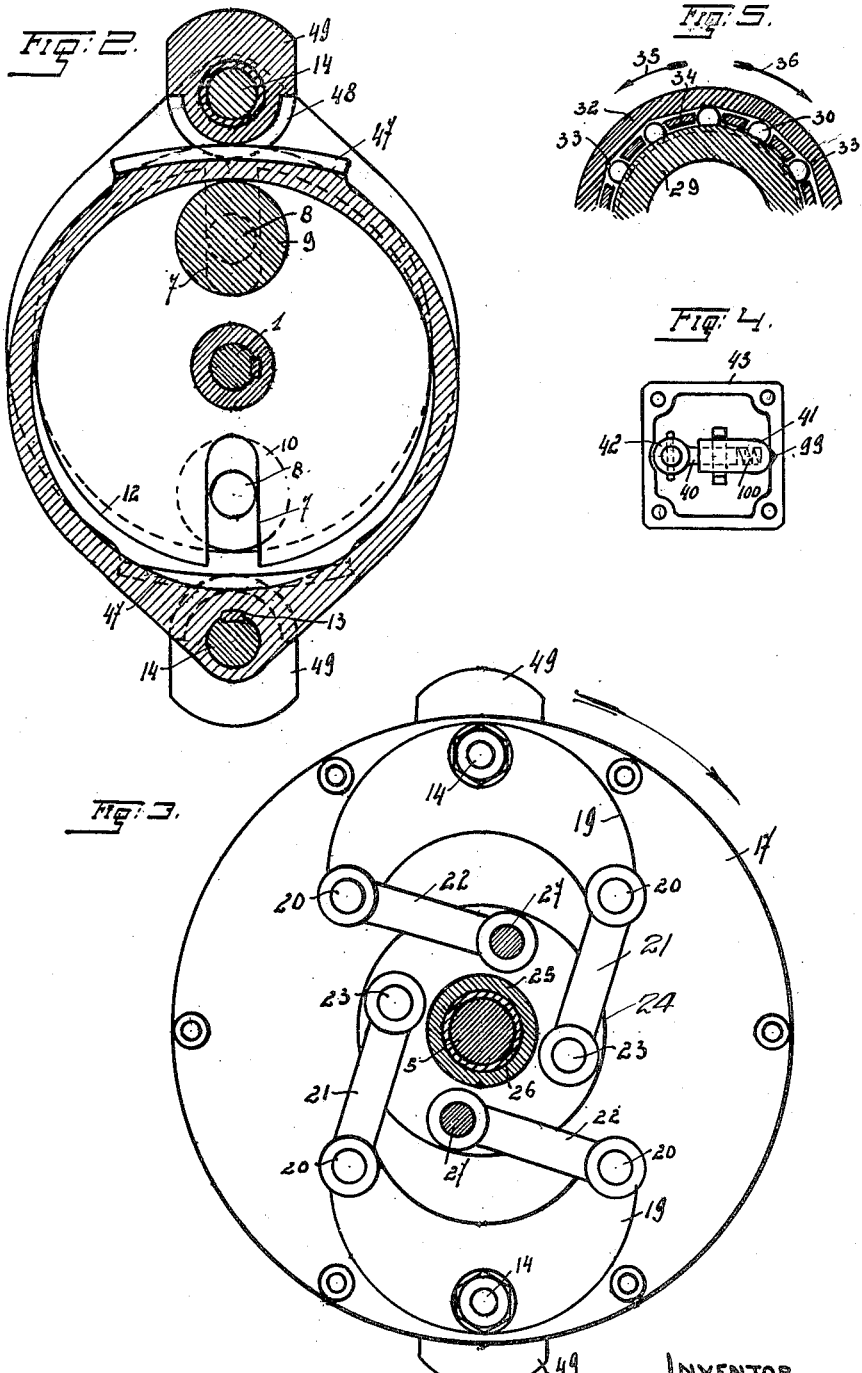

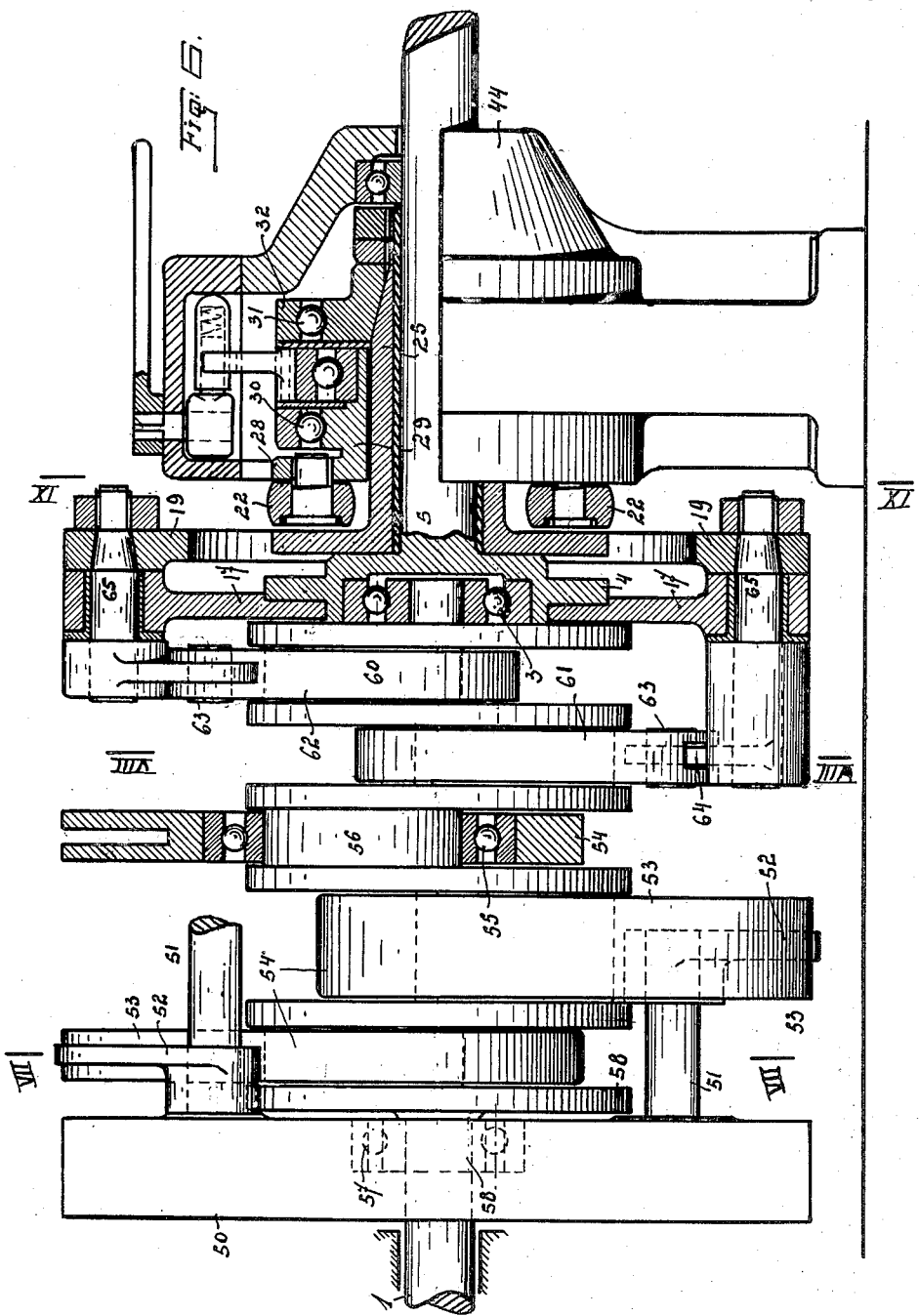

Sept. 20, 1932.   L. C. STURBELLE   1,878,727
CENTRIFUGAL VARIABLE SPEED GEAR
Filed April 15. 1929   6 Sheets-Sheet 4
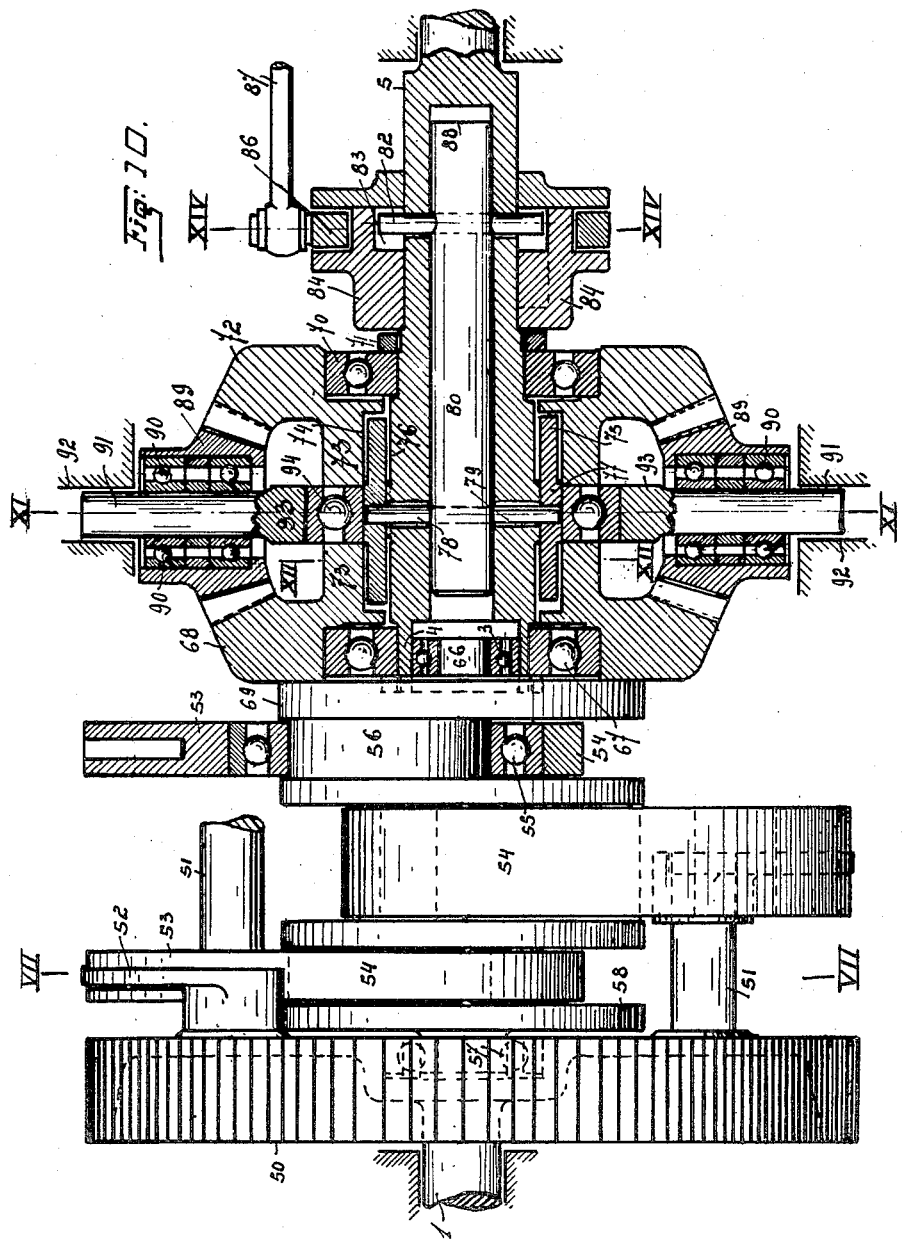
INVENTOR
Lucien C. Sturbelle
BY
ATTORNEY

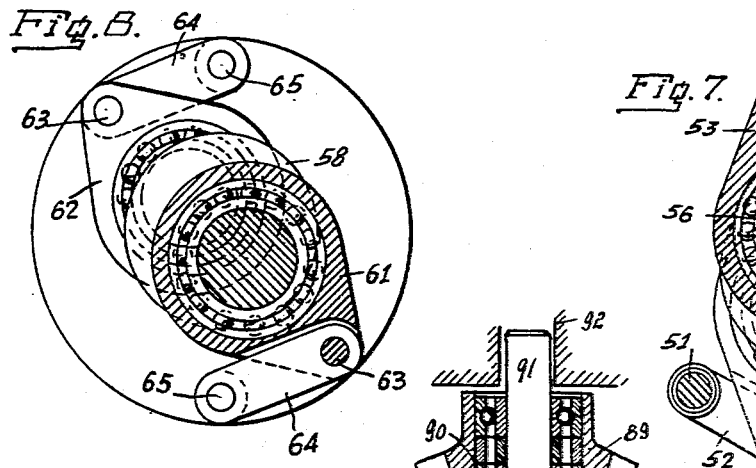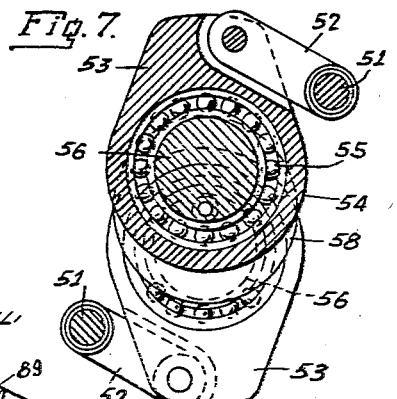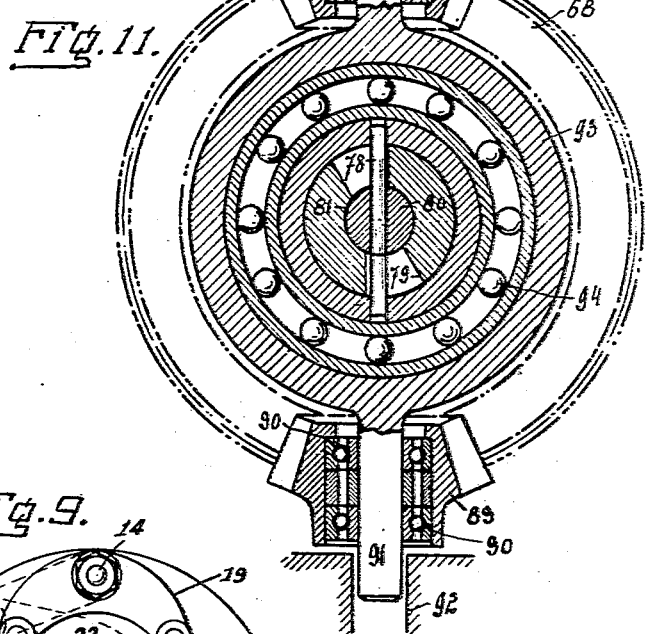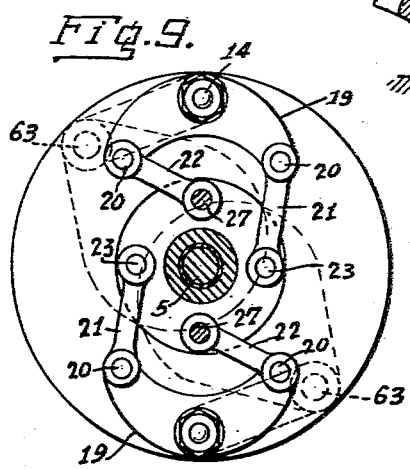

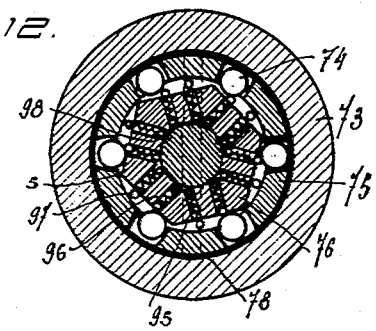
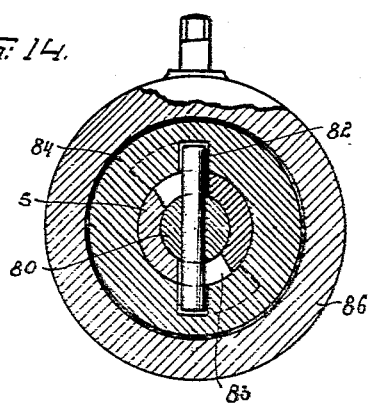
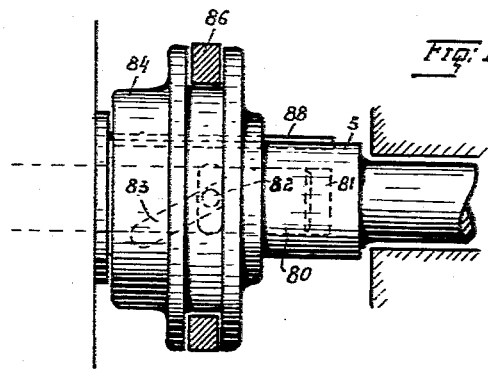

Patented Sept. 20, 1932

1,878,727

UNITED STATES PATENT OFFICE

LUCIEN CHARLES STURBELLE, OF STOCKEL, NEAR BRUSSELS, BELGIUM

CENTRIFUGAL VARIABLE SPEED GEAR

Application filed April 15, 1929, Serial No. 355,011, and in Belgium April 16, 1928.

My present invention relates to a variable speed gear of the kind based on the use of the centrifugal forces developed by revolving elements.

It has for its object to provide a mechanism of this kind which can be used in place of the ordinary speed change gears with toothed wheels and to obtain a drive as desired in one direction or the other.

With this object in view the invention essentially consists in the special arrangements and combinations of parts hereinafter fully described and pointed out in the appended claims.

On the annexed drawings:

Fig. 2 shows a cross section on the line II—II of Fig. 1.

Fig. 3 shows a front elevation of the driving disc of the driven shaft; this figure corresponds with a section on line III—III of Fig. 1.

Fig. 4 shows in plan a detail of the drive of the ball or roller device, which causes the driven shaft to be revolved in one direction or the other as desired.

Fig. 5 shows a section of a part of the free wheel device.

Fig. 6 shows an elevation and partial vertical section of a second embodiment, in which the crowns subjected to the action of the centrifugal masses which turn on the crank pins of a crank shaft whose oscillations are transmitted to the driven shaft, in the shape of a continuous rotary motion in the same way as in the example given in Figs. 1 to 4.

Fig. 7 shows a section on the line VII—VII of Fig. 6.

Fig. 8 shows a section on the line VIII—VIII and Fig. 9 a section on the line IX—IX of Fig. 6.

Figure 1:
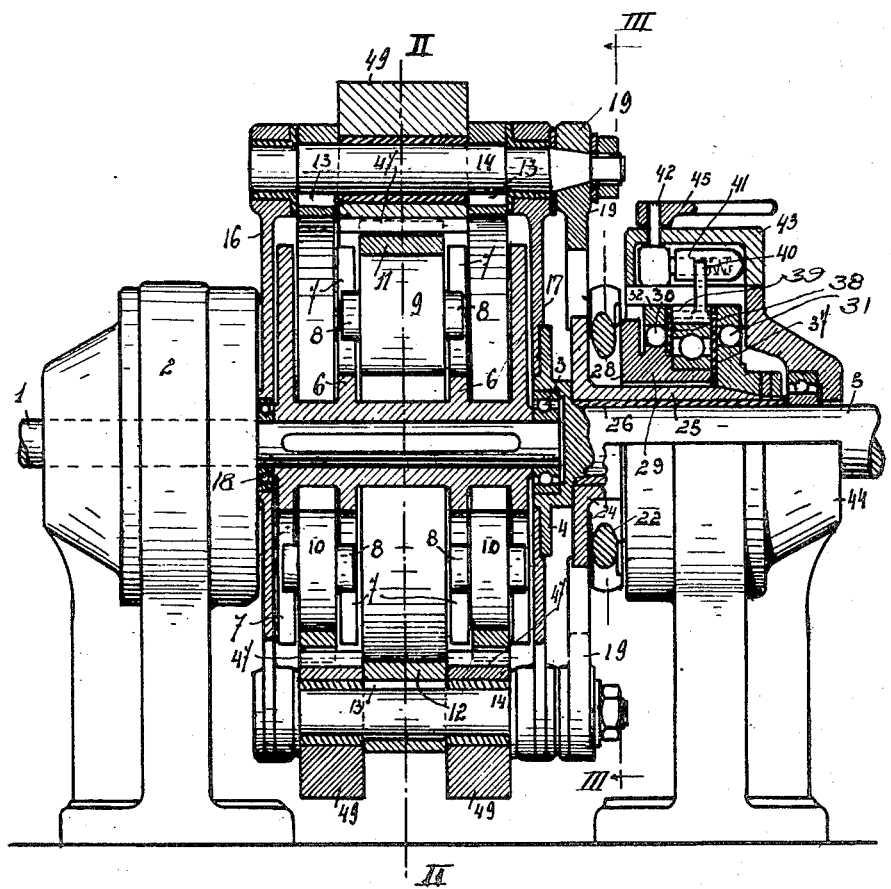
Fig. 1 shows a vertical section of one embodiment of the invention, in which the crowns subjected to the action of the centrifugal masses, oscillate on pivots mounted in the driving disc of the driven shaft and are supported in order to transmit the driving forces to said disc, by links on a ball or roller device which acts similarly to a free wheel device.

Fig. 10 is an elevation and partial section of a third embodiment, in which the oscillations of a crank shaft subjected to the action of the centrifugal masses are transmitted to the driven shaft in the shape of a continuous rotary motion, by means of two toothed wheels cooperating with planet pinions and united alternately with the driven shaft by means of a ball or roller device of the kind already shown in the embodiments of Figs. 1 and 6.

Fig. 11 shows a cross section on the line XI—XI of Fig. 10.

Fig. 12 is a section on the line XII—XII of Fig. 10.

Fig. 13 is a plan view of the driving member of the ball or roller device as used in the embodiment in Fig. 10, to change the direction of rotation of the driven shaft.

Fig. 14 is a section on line XIV—XIV of Fig. 10.

In the example of an embodiment shown in Figs. 1 to 5, the driving shaft 1 which turns in a bearing 2 is supported at its end by a ball bearing 3 mounted in a crown 4 bodily connected with the shaft 5 to be driven to which a variable speed inversely proportional to the value of the resisting couple acting on said shaft is to be transmitted. On the shaft 1 discs 6 are keyed provided with guide slots 7, in which centrifugal masses 9 and 10 are guided by means of journals 8. Those masses are arranged symmetrically with regards to the axis of the shaft 1. In the example shown the upper mass 9 is designed so as to balance two smaller masses 10 which move in the radial slot 7 of the discs 6, symmetrically with respect to the mass 9.

When the discs 6 turn with the driving shaft 1, these masses are kept in contact by the action of centrifugal force, with crowns 11 and 12, which are excentric with respect to the axis of the shaft 1 (Fig. 2) and which are keyed by means of keys 13 onto journals 14 supported by two discs 16 and 17.

The disc 16 turns freely round the shaft 1, on a ball bearing 18, whereas the disc 17 is bodily connected with the crown 4 fastened on the driven shaft 5, so that when said disc 17 is turned on the ball bearing 3, it carries with it the shaft 5. At the end of the journal 14 the curved arms 19 (Fig. 3) are keyed at the ends of which at 20, links 21 and 22 can pivot. The links 21 are jointed at their other ends 23, to a disc 24 fixed on a boss 25 which can turn freely on the shaft 5, on which it is carried for example, by an antifriction bush 26. The links 22 are connected in a similar manner at 27 to a disc 28 (Fig. 1) which is part of a boss capable of turning on the bushing 25. The bushings 25 and 29 form the inside crowns of two ball bearings 30 and 31, kept in place by outside rings 32. These rings 32 have, as shown in Fig. 5 an inside polygonal periphery with recesses 33 at the ends of which the balls of the bearings 30 and 31 are normally situated. The balls can be locked by a special arrangement by moving their cages in the direction of the arrows 35 or 36 (Fig. 5) so as to prevent the rotation of the bushings 25 or 29 in one direction or the other but to allow on the contrary the free rotation of these bushings in the opposite direction according to the position given to the ball cages 34. In order to allow the ball cages 34 to be moved easily, each of these is fixed to a driving ring 37 and 38 and these two rings are connected together by a cross bar 39 (Fig. 1) provided with an arm 40 cooperating with a lever 41 which pivots at 42 in a casing 43, forming part of the bearing 44 which supports the shaft 5. The journal 42 of the lever 41 is actuated by a lever 45, outside the casing 43. The rings 32 of the ball bearings 30 and 31 being suitably locked in the bearing 44, it is evident that according to the position given to the balls 30 and 31 by actuating the lever 45, the bosses 25 and 29 will be prevented from turning in one direction or the other, but can turn freely in the opposite direction similarly to a free wheel device.

The mechanism described works as follows: the rotation of the driving shaft 1 which carries with it the discs 6, causes the centrifugal masses 9 and 10 to be brought into contact with the crowns 11 and 12. If the resisting couple is small enough with respect to the driving couple, the masses carry with them the crowns 10 and 11 which turn, without oscillating, round the driving shaft 1 and carry with them in turning, by means of the pivots 14, the driving disc 17 which causes the shaft 5 to rotate. At this moment the bosses 25 and 29 are caused to revolve in the direction of their free rotation, so that the device including the curved levers 19 and the links 20 and 21 does not enter into action. The mechanism in this case acts the same as the one called a direct drive in the change gear with toothed wheels, the locking of the driven shaft with the driving shaft being then assured by the centrifugal reaction of the masses 9 and 10 on the crowns 11 and 12.

On the contrary if at a certain time, for example when starting the resisting couple is larger than the driving couple, the centrifugal reaction of the masses 9 and 10 being insufficient to carry with them the crowns 11 and 12, these are caused to oscillate with the pivots 14 which represent their centres of oscillation. Said crowns being keyed on said pivots, these pivot in the discs 16 and 17 and communicate a similar pivoting movement to the curved levers 19. This movement has a tendency to cause the bosses 25 or 29 to turn, by means of the links 21 or 22 but at this moment, one of these bosses, 29 for instance is prevented from turning, in the direction in which the link 22 pushes for instance by the locking of the balls 30 in the fixed ring 32 of the ball bearing corresponding, so that because of the thrust of the link 22 the pivot 14 is obliged to move, for instance, in the direction of the arrow 46 (Fig. 3) and thus causes a propelling reaction on the disc 17 which carries with it the shaft 5 in its movement of rotation, and thus communicates a driving impulsion to same. During this motion, the link 21 jointed on the disc 24 of the bushing 25 causes said disc to turn as in a free wheel device. Owing to these alternate oscillations of the crowns 11 and 12 the driving disc 17 will receive successive impulsions through the links 21 and 22 which impulsions will always be in the same direction, the ball bearings 30 and 31 coming into action alternately to provide the reactions necessary to cause the pivots 14 to revolve and consequently the discs 16 and 17 round the shaft 1. The shaft 5 will therefore be rotated continuously at a variable speed, according to the length of the oscillations of the crowns 11 and 12. The direction of rotation of the shaft 5 can on the other hand be changed as desired by simply moving the balls 30 and 31 into the recesses 33 of the fixed rings 32, the locking of said balls in one direction or the other causing, as already explained, the rotation of the bosses 25 and 29 in one direction or the other.

In the mechanism described above, the oscillation of the crowns 11 and 12 should in practice be limited in extension. To obtain this result, said crowns are provided with a toothed portion 47 gearing with the toothed portion 48 of the masses 49 which can turn round the pivots 14.

The arrangement of the masses 9 and 10 is not necessarily as shown in the Figures 1 and 2. Any other method of action of said centrifugal masses would be suitable. Fig. 6 shows as an example, another embodiment of the apparatus, in which the masses react on the crank pins of a crank shaft. In this example the shaft 1 which acts as driving shaft is united for example with a disc 50, which may be used as driver to start the motor. This disc 50 carries pins 51 which actuate by means of links 52 the masses 53 shaped as crowns 54 able to turn by means of ball bearings 55 round the crank pins 56 (Fig. 7) of a crank shaft which revolves at 57 in a ball bearing contained in the centre of the disc 50. This crank shaft 58 turns as before at the other end in a ball bearing 3 in the disc 4 formed by the driving shaft 5. The disc 4 cooperates with the driving disc 17 and turns in the bearing 44 containing the free wheel device consisting of the bosses 25 and 29 already described. In the example shown, the masses 53 are supposed to be distributed, as previously the masses 9 and 10, over three crowns 54. The crank shaft 58 has two supplementary crank pins 59 and 60, round which the crowns 61 and 62 can turn, jointed at 63 to links 64 keyed on pivots 65, corresponding to the pivots 14 already described in the preceding example. These pivots traverse the driving disc 17 and carry at their end, the curved levers 19 which cooperate with the links 21 and 22 (Fig. 9) jointed respectively on the discs of the bosses 25 and 29.

The working is substantially the same as in the example of the Fig. 1 with the sole difference that in the present case the action of the masses 53, rotated by the rods 51 round the crank pins of the crank shaft, has for effect that when the resisting couple is greater than the driving couple, they cause the crank shaft to oscillate. These oscillations are transmitted by the supplementary crank pins 59 and 60 to the receiving crowns 61 and 62, which, by means of the links 64, cause the pivots 65 to pivot in the driving disc 17. This disc receives the driving impulses by means of the links 21 and 22 which cooperate as already described with the ball bearings 30 and 31, locked in one direction or the other in the fixed rings 32. The Figures 10 to 14 show a third variety of embodiment, in which the oscillations produced by the centrifugal masses instead of being transmitted to the driven shaft by a system of levers and links cooperating with the free wheel device, are transmitted to said shaft by means of toothed wheels cooperating with planet pinions and acting on the free wheel device. In this embodiment, a crank shaft is used as in Fig. 6, on the crank pins of which the crowns 54 act, united to the masses 53 carried along by the links 51 in the rotation of the disc 50 which is fixed on the driving shaft 1. In this construction, the crank shaft turns as before, with its end 66 in a ball bearing 3, arranged in a groove at the end of the driven shaft 5. On this shaft turns, by means of a ball bearing 67 a bevel wheel 68 fixed on the disc 69, which is united to the last crank pin of the crank shaft. On the other hand, there is mounted on the driven shaft 5, on a second ball bearing 70 held by a collar 71, a second bevel wheel 72 similar to the wheel 68. The toothed wheels 68 and 72 have circular collars 73 supported on rollers 74 mounted in cages 75 (Figs. 10 and 12). The rollers 74 bear on the faces 76 of a polygonal part (Fig. 12) formed on the shaft 5. The roller cages 75 are fixed to a central collar 77 in which a pin 78 fits, passing diametrically through a hole 79, made in the polygonal part 76 of the shaft 5. The pin 79 is united to a rod 80 contained in a central bore 81 of the end of the shaft 5, and said rod can be moved axially by means of a pin 82 which engages an helicoidal groove in a sleeve 84, which can be moved axially on the shaft 5 by means of a collar 86 actuated by a rod 87. The sleeve 84 is guided in its movement on the shaft 5 by a fixed key 88. The result is that according to the position given to the sleeve 84, the helicoidal groove 83 causes a partial revolution of the rod 80 inside the shaft 5, which revolution has for effect to bring the rollers 74, by means of the cages 75, into such a position with regard to the polygonal part of the shaft 5, that the bevel wheels 68 and 72 are locked in one direction of rotation and free in the other direction, the same as the bosses 25 and 29 in the examples of Figs. 1 and 5. The bevel wheels 68 and 72 cooperate on the other hand, with planet pinions 89 mounted by means of roller bearings 90 on pins 91 fixed in a casing 92, which forms a gear case enclosing all the mechanism. The pins 91 are formed as radial projections on a ring 93 carried by a ball bearing 94 arranged between the crowns 73 formed by the toothed wheels 68 and 72.

This device works in a similar manner to those already described: the masses 53 turning round the crank pins of the crank shaft, cause the latter to oscillate as in the embodiment in Fig. 6. In the present case however, these oscillations are communicated by the disc 69 to the bevel wheel 68. If the position of the rollers 74, determined by the position of the cages 75 is such that the rollers are in their middle position in regard to the polygonal faces 76 of the shaft 5, the bevel wheel 68 turns freely without carrying the shaft 5 with it, and communicates its movement by means of the planet pinions 89 to the toothed wheel 72, which also turns freely on the ball bearing 70. If on the contrary by moving the sleeve 84 and rotating partially the rod 80 as a result to the position shown in Fig. 12, these rollers lock the crown 73 of the bevel wheel 68 in regard to the polygonal part 76 of the shaft 5 so that the toothed wheel 68 actuates said shaft when it revolves, in oscillating in one direction with the crank shaft, but leaves said shaft free when the crank shaft oscillates in the other direction. But the moment the oscillation of the toothed wheel 68 is transmitted by the planet pinions 89 to the bevel wheel 72, the latter carries with it in turn the shaft 5 by means of the rollers 74 locked between the crown 73 of the toothed wheel 72 and the faces of the polygonal part 76 of the shaft 5. The alternative oscillations of the crank shaft in one direction or the other, are therefore transmitted to the shaft 5 in the form of a continuous movement of rotation, by the bevel wheel 68 and by the bevel wheel 72. These wheels being capable of being locked by the roller bearing 74 as desired in one direction or the other, by the partial revolution of the cages 75 caused by the axial movement of the sleeve 84 as already explained the mechanism can work the same as the previous ones, indifferently in one direction or the other, thus obtaining not only forward motion, but also backward motion at variable speeds.

In the free wheel device, with balls, or rollers, of the kind shown in Figs. 5 and 12, it may be advisable, in order to maintain the balls or the rollers in the definite position out of gear, either of the bosses 25 and 29 (Figs. 1 and 5) or of the crowns of the bevel wheels 78 and 72, to adopt an arrangement of the kind shown in Fig. 12.

With this object, holes 95 are bored in the polygonal part of the shaft 5, in each face, and in these holes springs 96 are placed between balls 97 and 98. The balls 98 rest on the rod 80 passing through the centre of the shaft 5 and the springs 96 push, by means of the balls 97, the rollers 74 into their working position (as shown in Fig. 12). On the contrary, when the cages 75 are moved into the inoperative position, the rollers 74 are maintained in said inoperative position between two adjacent balls 97 arranged in the same face 76 of the polygonal part of the shaft 5.

In each of the embodiments described the lever which determines the position of the cages for balls or rollers, i. e. the lever 44 in the example in Figs. 1 and 6 or the lever 87 in the embodiment in Fig. 10 can occupy three positions fixed by notches corresponding to a forward drive, the inoperative position, or the backward drive. In the embodiment of Fig. 1, this locking is obtained by means of a catch 99 (Fig. 4) pushed by a strong spring 100 which maintains the catch engaged in the notch corresponding to the drive required.

In the practical embodiment of the cages for balls or rollers included in the free wheel device, the polygonal part 76 may advantageously be replaced by curved surfaces, whose centre would be slightly excentric in regard to the centre of the cage for balls or rollers.

As will be remarked, in the three kinds of embodiment described as examples only, the continuous rotary movement of the resisting shaft may be obtained in one direction or the other as desired.

I claim:

1. In a centrifugal variable speed gear in combination a driving shaft, a driven shaft, centrifugal elements, connected to be actuated by said driving shaft, a crank shaft connected to said centrifugal elements and adapted to be oscillated under the action of the centrifugal elements, a gear rotatably mounted on the end of the said driven shaft, means for transmitting the oscillations of the crank shaft to the gear, another gear rotatably mounted on the driven shaft, idler pinions connecting said gears together, flanges on said gears forming rings surrounding the driven shaft, said drive shaft being polygonal in cross section throughout the portion surrounded by the flanges on said gears, balls arranged between the said polygonal part and the said flanges, cages in which the balls are mounted, means for displacing the ball cages to lock the gears against relative rotation with respect to the driven shaft in the desired direction of rotation of the driven shaft.

2. In a centrifugal variable speed gear, in combination a driving shaft, a hollow driven shaft, centrifugal elements connected to said driving shaft to be actuated thereby, a crank shaft connected to said centrifugal elements and adapted to be oscillated under the action of the centrifugal elements, a gear rotatably mounted on the end of the said driven shaft, means for transmitting the oscillations of the crank shaft to the gear, another gear rotatably mounted on the driven shaft, idler pinions connecting the gears together, flanges on said gears surrounding the driven shaft, said driven shaft being polygonal in cross section throughout the portion surrounded by said flanges, balls arranged between the said polygonal part of the driven shaft and the said flanges, cages in which the balls are mounted, a ring to which the cages are connected, a mandrel mounted in a bore of the driven shaft and engaging the ring, a rod connected to the mandrel and arranged inside of the driven shaft, and means for displacing the rod for causing the balls to lock the gears relative to the driven shaft in the desired direction of rotation of the driven shaft.

In testimony whereof I have affixed my signature.

LUCIEN CHARLES STURBELLE.